May 3, 1927.
W. E. SHARP
1,627,207
LOCK NUT AND METHOD OF MAKING THE SAME
Filed May 15, 1922
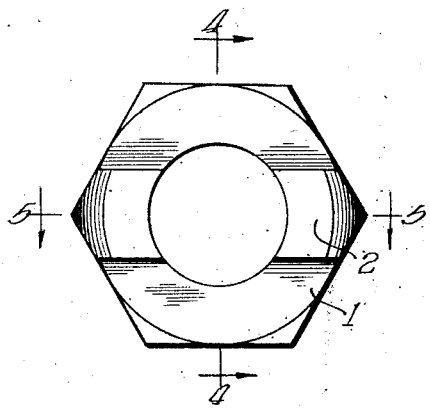
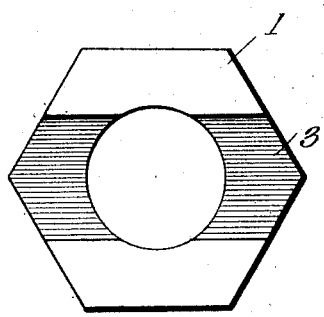
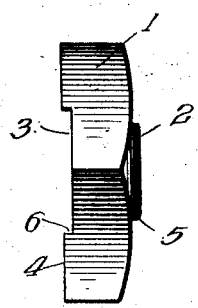
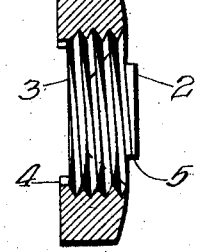
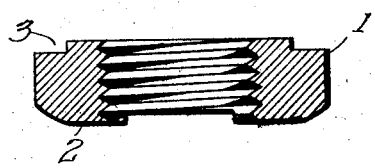

Patented May 3, 1927.

1,627,207

UNITED STATES PATENT OFFICE.

WILLIAM E. SHARP, OF CHICAGO, ILLINOIS, ASSIGNOR TO GRIP NUT COMPANY, OF CHICAGO, ILLINOIS, A CORPORATION OF ILLINOIS.

LOCK NUT AND METHOD OF MAKING THE SAME.

Application filed May 15, 1922. Serial No. 560,994.

My invention belongs to that general class of lock nuts in which a portion of the threads extending through the nut are, during the process of manufacture, caused to take an abnormal position, bent or otherwise, while the remainder of the threads are preferably normal. By this construction the nut may be readily threaded on the cooperating bolt until the threads in the bolt reach the abnormal threads, at which point the threads of the nut so engage the threads of the bolt as to practically lock the nut thereon in such manner that it may not be accidentally disengaged by vibration or jarring. Such nuts are particularly valuable in all places where they are mounted upon parts which are particularly subject to vibration, as upon railroad cars, locomotives, automobiles, and the like.

The object of my present invention is to produce a nut of the general character described which shall be practical and effective in operation, economical in construction and durable in use.

To this end my invention consists in the novel construction, arrangement and combination of parts herein shown and described, and more particularly pointed out in the claims.

In the drawings, wherein like reference characters indicate like or corresponding parts, Fig. 1 is a top plan view of my improved nut;

Fig. 2 is a bottom plan view of the same;

Fig. 3 is an edge view of the nut in a line parallel with the ridge and depression;

Fig. 4 is a section taken substantially on line 4—4 of Fig. 1; and

Fig. 5 is a similar section taken on line 5—5 of Fig. 1.

In the preferred form illustrated in the drawings, 1 indicates a suitable nut blank, as shown, hexagon in form, although any other form may be employed if preferred. In forming the blank, a centrally disposed ridge 2 is formed on one face of the nut, while on the other face directly opposite and substantially parallel thereto is formed a depression 3. The depression, as shown, is of a width slightly greater than the width of the ridge. After the blank is so formed and the bolt hole punched therein, the nut is threaded in the usual manner. Thereafter the flat face 4 is placed upon an anvil so as to be supported preferably clear across the same, except only in line with the depression 3. Pressure is then brought to bear upon the ridge 2 sufficient to cause the metal substantially in alignment with the space between the outer edge of the ridge, as at 5, and the inner edge of the depression, as at 6, to be slightly bent or distorted. It is for this reason that the depression is slightly wider than the ridge, so as to cause the tendency to bend to be somewhat greater than the tendency to cause the metal to flow should the face 4 of the nut be full clear across in the usual manner.

The deflection necessarily is but slight and causes but a slight modification of the distance between the contiguous threads of the nut, as otherwise the nut could not be threaded upon the bolt. The deflection, however, is sufficient to bring the threads in line therewith to such position that they will bear or bind with greater frictional force upon the cooperating threads of the bolt than do the normal unaffected threads in the nut. In the drawings such deflection is exaggerated in order to clearly bring out the construction.

Such form of nut is adapted for very large nuts for heavy work, as well as small nuts. In the prefered form the nut is forged out of a flat bar of steel, particularly when intended for such large use, and as an illustration I would say that I have secured satisfactory results with nuts for locomotive use 5¾ inches from flat edge to flat edge in a hexagon nut, with a bolt hole 3.317 in diameter, in which the ridge was 2⅝ in width and the depression 2-63/64 of an inch. This is only illustrative, however, showing the adaptability of this form of nut for heavy service on locomotives. I have also secured satisfactory results with the bolt hole ¾ of an inch down, so that the nut is adapted for all purposes.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is;

1. The process of manufacturing a lock nut, consisting in taking a nut blank provided with an elevated ridge on one face and a depression on the other face, the width of the depression being slightly greater than the width of the ridge, screw-threading the blank, and placing the nut with its recessed face upon a suitable anvil and applying pressure to the ridge to cause the threads in alignment with the ridge and depression to be slightly distorted out of their normal form.

2. A lock nut comprising a screw-threaded nut provided with an elevated ridge on one face and a cooperating depression on the other face, the depression being of slightly greater width than the ridge, with the threads in alignment with the ridge and depression in the region of their junction with the body slightly bent out of their normal position.

3. A lock nut comprising a screw threaded nut provided with an abrupt ridge on one face and a cooperating depresion on the other face, the bottom depressed portion below the ridge being angular, with the threads in alignment with the ridge and depression in the region of their junction with the body slightly bent out of their normal position.

In testimony whereof, I have hereunto signed my name.

WILLIAM E. SHARP.